# 2,941,451

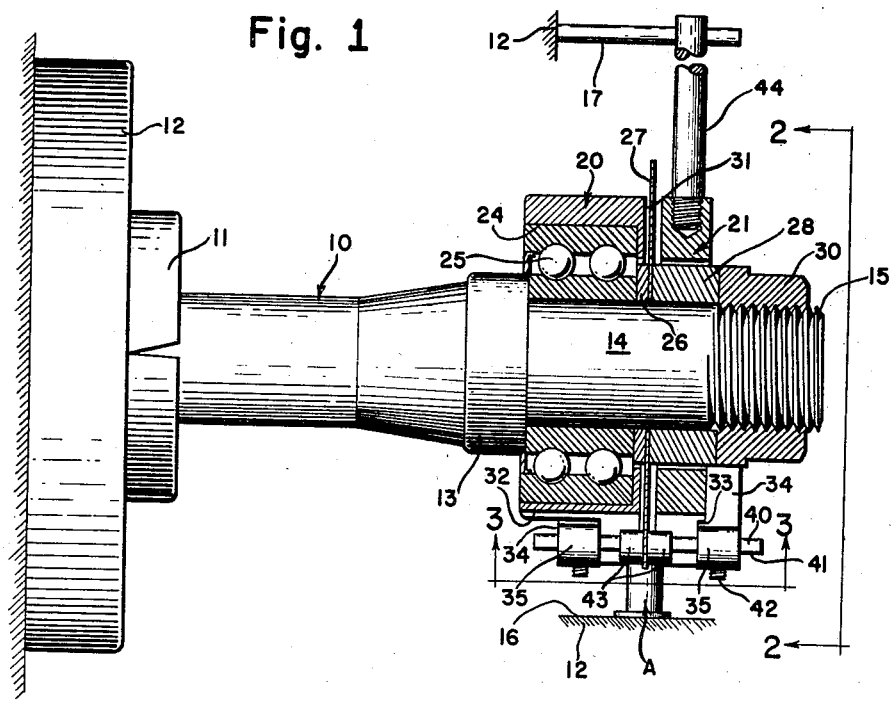
Fig. 1
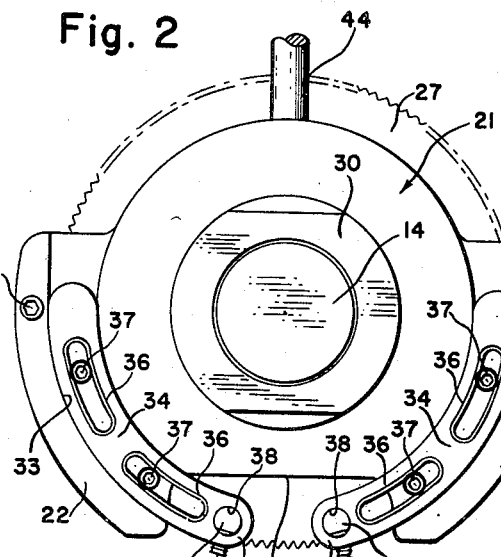
Fig. 2
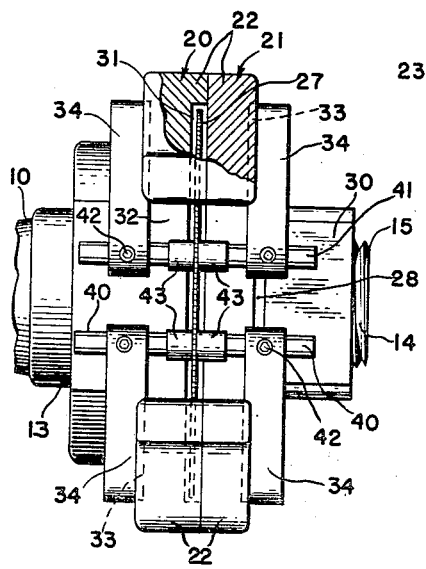
Fig. 3
INVENTORS
Berger G. Hanson
Lester G. Oechsner
ATTORNEY

CUTTER SUPPORT

Berger G. Hanson and Lester G. Oechsner, Tucson, Ariz., assignors to Hughes Aircraft Company, Culver City, Calif., a corporation of Delaware Filed May 2, 1956, Ser. No. 582,624

2 Claims. (Cl. 90—11)

The present invention relates generally to a cutting device and relates more specifically to a saw arrangement and support structure therefor.

In many instances it is desirable and often necessary to cut slots or the like in ends of relatively small elongated objects. In these instances it has been the practice to employ a narrow saw blade suitably mounted on an arbor and secured thereon as by any well-known means; however, in instances where the slots are relatively narrow and an associated relatively narrow saw blade is employed, it is difficult and often impossible to prevent deflection of the blade in directions parallel to the axis of the arbor, and accordingly lateral miscutting of the object on which the work is being performed. Thus, accuracy of the slot is destroyed and the parts or objects produced are unusable for the purposes intended.

Additionally, even though extreme accuracy of slot alignment is unnecessary or impracticable, lateral drift or creep of the saw blade causes considerable wear of the teeth of the blade on one side thereof, thus not only damaging the blade but creating a further undesirable situation wherein cutting is being accomplished more on one side of the saw teeth than the other and causing addtional lateral creeping of the blade. Thus, a compound situation is encountered, the present invention contemplating the provision of mechanism to enable correction or elimination of the problems stated hereinbefore.

In still another instance, where deeper slots are being cut into the ends of elongated either rectangular or cylindrical members, it is necessary that the radial exposed surfaces of the cutting blade be proportionately large as compared to the width of the blade. In these instances, greater deflection of the blade has heretofore been experienced, inasmuch as support therefor has been associated with and positioned adjacent to the central area of the blade.

It is accordingly one important object in the present invention to provide a saw blade support constructed in a manner whereby to overcome the beforementioned difficulties associated with heretofore known saw blade support structures.

It is another important object of the present invention to provide a novel saw blade support including means for guiding, supporting and aligning a peripheral portion of a saw blade with respect to material on which work is being accomplished.

It is still another object of the present invention to provide a saw support structure that is simple in construction, inexpensive in manufacture, reliable in use and operation and which includes a minimum of components that are adjustably arranged in a manner enabling efficient use thereof.

Other and further important objects of the present invention will become apparent from the disclosures in the following detailed specification, appended claims and accompanying drawing, wherein:

Figure 1 is an elongated sectional view of the saw support of the present invention as diagrammatically associated with a driving means therefor:

Fig. 2 is a front elevational view of the present structure as taken substantially as indicated by line 2—2, Fig. 1; and Fig. 3 is a bottom plan view of the present saw support structure.

With reference primarily to Fig. 1, the device of the present invention is shown as being mounted on a suitable arbor indicated generally at 10, the arbor 10 being secured in the usual manner in a chuck 11 mounted on any suitable driving means 12 which may be a drill press, milling machine, shaper or other suitable device. The arbor 10 has a flange portion 13 and a shaft portion 14, the outer end of the shaft portion 14 being provided with threads as at 15. The machine 12 is provided with a work supporting surface 16 on which an object to be cut is positioned, in this instance, the object being indicated at A. The machine 12 has further depended therefrom a stop member 17, the purpose of which to be hereinafter more fully described.

The cutter support comprises a pair of body portions 20 and 21 that are generally circular having semicircular, peripherally extending flange portions 22 that are joined together by means of bolts 23, or the like. The body portion or support housing 20 is further provided with a recess 24 in which a suitable roller bearing 25 is positioned. The inner race of the roller bearing 25 is mounted tightly on the shaft portion 14 of the arbor 10. A washer 26 is disposed about the arbor shaft 14 and against one axial end of the inner race of the bearing 25, the other axial end thereof being disposed in abutting relationship with respect to one side of the flange 13 of the arbor 10. A circular cutter in the form of a saw blade 27 is thereafter positioned on the shaft portion 14 against the washer 26, with the saw blade, washer and roller bearing being retained in position on the arbor by means of a spacer 28 disposed about the shaft portion 14 and a nut 30 engaging the threads 15 on the arbor shaft portion. The radial surfaces of the blade 27 are partially encompassed by the body portions 21 and 22 over a large area thereof, with the blade being positioned essentially within a recess 31 in the body portion 20.

As shown primarily in Figs. 2 and 3, the body portion 20 and the portion or guard 21, structure together with the peripheral portions 22 thereof, have a generally rectilinear slot or recess 32 that is radially disposed, thus to expose a portion of the saw blade 27. The body portions 20 and 21 are further provided with circumferentially extending grooves 33 adjacent the peripheral area thereof, there being arcuate arms 34 positioned within the grooves 24 and extending laterally outwardly therefrom adjacently disposed ends 35 of the arms 34 are positioned normally within the area of the recess 32. The arms 34 are each provided with a pair of arcuate slots 36, through which bolts 37 extend, the bolts 37 making threaded engagement with the body portions 20 and 21 and providing means for arcuate adjustment of the position of the arms 34.

The inner ends 35 of the arms 34 are each provided with lateral bores 38 in which saw guide members 40 are positioned. The saw guide members 40 have flattened side portions 41, there being set screws 42 positioned through the inner end portions 35 of the arms 34 and adapted for engagement with the flattened portions 41, whereby to secure the saw guide members 40 in the desired position. Each of the saw guide members 40 is provided with an enlarged head portion 43 that is adapted to engage the lateral sides of the blade 27 adjacent the peripheral portion of the blade and within the recess 32.

In operation, the blade 27 is assembled with regard to the arbor 10, as described hereinbefore, and a rod 44, which threadably engages the body portion 21, extends radially outwardly therefrom, is positioned in contact with the stop member 17 thus to limit inadvertent rotation of the body portions 20 and 21. Thereafter, the arms 34 are circumferentially adjusted in order that the ends 35 thereof will be positioned as closely as possible to the sides or dimensional limits of the work A. Additionally, the portions 43 of the guide members 40 are positioned in engagement with the sides of the saw blade 27. Thus, the blade 27 is guided as closely as possible adjacent the portion thereof acting to cut a slot S into work A, accurately to create a precise slot therein. Preferably the saw guide members 43 are constructed from brass or the like so as to create as little friction as possible and prevent damage to the saw blade 27.

It will therefore be noted that the device of the present invention is extremely simple in construction, employs a relatively small number of parts and is therefore inexpensive in manufacture and reliable in use, with the effectiveness of operation thereof being evident from the novel support arrangement in close proximity to the material on which the work is being performed, thus to prevent the aforementioned drift or creep of the saw blade, enable longer life thereof and, of course, reduce expenses involved in replacement and/or sharpening of the saw blades.

Having thus described the invention and the present embodiment thereof, it is desired to emphasize the fact that many modifications may be resorted to in a manner limited only by a just interpretation of the following claims.

What is claimed is:

1. A cutter support comprising, in combination: a pair of body portions defining a support housing and a guard structure, said body portions being secured together at peripheral areas thereof; a recess defined between said body portions; a ball bearing carried by said support housing; an arbor rotatably journalled in said bearing; a circular saw blade disposed on said arbor and in said recess; nut means for securing said saw blade to said arbor and in contact with an inner race of said bearing; a radially extending slot in a peripheral area of said body portions for exposing an area of said saw blade; annular grooves in outer faces of said body portions; arcuate arms adjustably positioned in said grooves; a plurality of saw blade guide members carried by said arms, said guide members being disposed parallel to an axis of said arbor for engagement with opposite sides of said saw blade within confines of said slot; and a stabilizing rod disposed radially outwardly from said guard structure and engageable with an adjacent fixed structure for limiting rotational movement of said body portions and said saw guide members about said arbor, said arbor being adapted for support and rotation by a driving unit whereby to drive said saw blade, cutting thereby being accomplished between said saw guide members.

2. A cutter support comprising, in combination: a pair of body portions defining a support housing and a guard structure, said body portions being secured together at peripheral areas thereof; a recess defined between said body portions; a ball bearing carried by said support housing; an arbor rotatably journalled in said bearing; a circular saw blade disposed on said arbor and in said recess; nut and washer means for securing said saw blade to said arbor and in contact with an inner race of said bearing; a radially extending generally rectilinear slot in a peripheral area of said body portions for exposing an area of said saw blade; annular grooves in outer faces of said body portions adjacent peripheral areas thereof; arcuate arms adjustably positioned in each of said grooves; a plurality of saw blade guide members adjustably carried by adjacently disposed ends of said arms, said guide members being disposed parallel to an axis of said arbor for engagement with opposite sides of said saw blade within confines of said slot; and a stabilizing rod disposed radially outwardly from said guard structure and engageable with an adjacent fixed structure for limiting rotational movement of said body portions and said saw guide members about said arbor, said arbor being adapted for support and rotation by a driving unit whereby to drive said saw blade, cutting thereby being accomplished between said saw guide members.

References Cited in the file of this patent

UNITED STATES PATENTS

| | | |
|---|---|---|
| 292,331 | Liddell | Jan. 22, 1884 |
| 1,457,600 | Parker | June 5, 1923 |
| 1,982,083 | Strand | Nov. 27, 1934 |
| 2,589,309 | Tompkins | Mar. 18, 1952 |
| 2,709,464 | Kreidler | May 31, 1955 |